United States Patent
Gibson et al.

(10) Patent No.: US 10,771,982 B2
(45) Date of Patent: Sep. 8, 2020

(54) RESOURCE UTILIZATION OF HETEROGENEOUS COMPUTE UNITS IN ELECTRONIC DESIGN AUTOMATION

(71) Applicant: Mentor Graphics Corporation, Wilsonville, OR (US)

(72) Inventors: Patrick D. Gibson, Tualatin, OR (US); Robert A. Todd, Beaverton, OR (US)

(73) Assignee: Mentor Graphics Corporation, Wilsonville, OR (US)

(*) Notice: Subject to any disclaimer, the term of this patent is extended or adjusted under 35 U.S.C. 154(b) by 30 days.

(21) Appl. No.: 16/169,306

(22) Filed: Oct. 24, 2018

(65) Prior Publication Data

US 2020/0137581 A1    Apr. 30, 2020

(51) Int. Cl.
G06F 9/50 (2006.01)
H04W 16/10 (2009.01)
H04L 5/00 (2006.01)
H04W 24/02 (2009.01)

(52) U.S. Cl.
CPC .......... H04W 16/10 (2013.01); G06F 9/5061 (2013.01); H04L 5/0032 (2013.01); H04W 24/02 (2013.01)

(58) Field of Classification Search
CPC ............................. G06F 9/5061; H04L 5/0032
USPC .................. 716/101, 106, 110, 111
See application file for complete search history.

(56) References Cited

U.S. PATENT DOCUMENTS

| 6,080,204 A | 6/2000 | Mendel |
| 6,539,522 B1 | 3/2003 | Devins et al. |
| 6,578,174 B2 | 6/2003 | Zizzo |
| 6,634,008 B1 | 10/2003 | Dole |
| 6,782,408 B1* | 8/2004 | Chandra et al. ...... G06F 9/5061 709/224 |
| 7,092,985 B2 | 8/2006 | Hubbard |
| 7,512,728 B2 | 3/2009 | Tseng |
| 7,526,740 B2 | 4/2009 | Bohl et al. |
| 7,565,656 B2 | 7/2009 | Yamasaki et al. |
| 7,681,242 B2 | 3/2010 | Green et al. |
| 7,930,398 B2 | 4/2011 | Kawato |
| 8,032,846 B1 | 10/2011 | Balasubramanian et al. |
| 8,321,558 B1 | 11/2012 | Sirota et al. |
| 8,386,982 B1* | 2/2013 | Mishra et al. ........ G06F 17/505 716/124 |

(Continued)

OTHER PUBLICATIONS

Helal Ahmed et al., "Parallel Circuit Simulation using the Direct Method on a Heterogeneous Cloud", 2015 52nd ACM/EDAC/IEEE Design Automation Conference (DAC), IEEE, Jun. 8, 2015, [retrieved on Jul. 24, 2015], pp. 1-6.

(Continued)

*Primary Examiner* — Sun J Lin (57) ABSTRACT

A system may include a pool of heterogeneous compute units configured to execute an electronic design automation (EDA) application for design or verification of a circuit, wherein the pool of heterogeneous compute units includes compute units with differing computing capabilities. The system may also include a resource utilization engine configured to identify an EDA operation to be performed for the EDA application, select a compute unit among the pool of heterogeneous compute units to execute the EDA operation based on a determined computing capability specific to the selected compute unit, and assign execution of the EDA operation to the selected compute unit.

20 Claims, 6 Drawing Sheets

(56) References Cited

U.S. PATENT DOCUMENTS

| | | | |
|---|---|---|---|
| 8,429,276 B1 | 4/2013 | Kumar et al. | |
| 8,448,112 B1* | 5/2013 | Kashai et al. | ...... G06F 17/5036 716/104 |
| 8,578,381 B2 | 11/2013 | Podila | |
| 8,595,667 B1* | 11/2013 | Shroff et al. | ........ G06F 17/5077 716/111 |
| 8,606,920 B1 | 12/2013 | Gupta et al. | |
| 8,656,368 B1* | 2/2014 | Ovadia et al. | ...... G06F 11/3466 714/38.1 |
| 8,667,454 B1* | 3/2014 | Subrahmanya et al. | ...................... G06F 17/5068 716/137 |
| 8,726,224 B1* | 5/2014 | Giangarra et al. | ............................ G06F 17/5036 716/132 |
| 8,964,321 B2* | 2/2015 | Cideciyan et al. | .... G11B 20/02 360/31 |
| 9,026,630 B2 | 5/2015 | Gulati et al. | |
| 9,491,112 B1* | 11/2016 | Patel et al. | .............. H04L 47/70 |
| 9,535,740 B1 | 1/2017 | Graham et al. | |
| 9,558,037 B2 | 1/2017 | Dweck et al. | |
| 9,864,636 B1* | 1/2018 | Patel et al. | ............ G06F 9/5061 |
| 10,069,693 B1 | 9/2018 | Daptardar et al. | |
| 10,387,682 B2 | 8/2019 | Kalafala et al. | |
| 2004/0098391 A1 | 5/2004 | Robertson et al. | |
| 2004/0236556 A1 | 11/2004 | Lin | |
| 2005/0066331 A1 | 3/2005 | Inoue et al. | |
| 2006/0059565 A1 | 3/2006 | Green et al. | |
| 2006/0090162 A1* | 4/2006 | Flores et al. | ............ G06F 8/656 718/104 |
| 2006/0200266 A1 | 9/2006 | Fotakis et al. | |
| 2008/0115096 A1* | 5/2008 | Pikus | .................. G06F 17/5081 716/52 |
| 2009/0064075 A1 | 3/2009 | Gross et al. | |
| 2009/0106008 A1 | 4/2009 | Branson et al. | |
| 2010/0332818 A1 | 12/2010 | Prahlad et al. | |
| 2011/0246653 A1 | 10/2011 | Balasubramanian et al. | |
| 2012/0131194 A1 | 5/2012 | Morgan | |
| 2012/0259982 A1 | 10/2012 | Tatsubori et al. | |
| 2014/0046998 A1 | 2/2014 | Dain et al. | |
| 2014/0047119 A1 | 2/2014 | Wong et al. | |
| 2017/0277550 A1* | 9/2017 | Zhang et al. | ....... G06F 11/3024 |

OTHER PUBLICATIONS

Unknown, "Optimizing Electronic Design Automation (EDA) Workflows on AWS", Amazon Web Services, Sep. 1, 2018, Retrieved from the Internet: URL:https://d1.awsstatic.com/HPC2019/optimizing-electronic-design-automation-eda-workflows-on-aws.pdf [retrieved on Dec. 19, 2019], pp. 1-55.

* cited by examiner

RESOURCE UTILIZATION OF HETEROGENEOUS COMPUTE UNITS IN ELECTRONIC DESIGN AUTOMATION

BACKGROUND

Electronic circuits, such as integrated microcircuits, are used in nearly every facet of modern society from automobiles to microwaves to personal computers. Design of microcircuits may involve many steps, known as a "design flow." The particular steps of a design flow are often dependent upon the type of microcircuit being designed, its complexity, the design team, and the microcircuit fabricator or foundry that will manufacture the microcircuit. Electronic design automation (EDA) applications support the design and verification of circuits prior to fabrication. EDA applications may include various functions, tools, or features to test or verify a design at various stages of the design flow.

SUMMARY

Disclosed implementations include systems, methods, devices, and logic that may support resource utilization of heterogeneous compute units in execution of EDA operations.

In one example, a method may be performed, executed, or otherwise carried out by a computing system. The method may include identifying a pool of heterogeneous compute units configured to execute an EDA application for design or verification of a circuit, wherein the pool of heterogeneous compute units includes a plurality of compute units with differing computing capabilities; identifying an EDA operation to be performed for the EDA application; selecting a compute unit among the pool of heterogeneous compute units to execute the EDA operation based on a determined computing capability specific to the selected compute unit; and assigning execution of the EDA operation to the selected compute unit.

In another example, a system may include a pool of heterogeneous compute units configured to execute an EDA application for design or verification of a circuit, wherein the pool of heterogeneous compute units includes a plurality of compute units with differing computing capabilities. The system may also include a resource utilization engine configured to identify an EDA operation to be performed for the EDA application; select a compute unit among the pool of heterogeneous compute units to execute the EDA operation based on a determined computing capability specific to the selected compute unit; and assign execution of the EDA operation to the selected compute unit.

In yet another example, a non-transitory machine-readable medium may store processor-executable instructions. When executed, the instructions may cause a system to identify a pool of heterogeneous compute units configured to execute an EDA application for design or verification of a circuit, wherein the pool of heterogeneous compute units includes a plurality of compute units with differing computing capabilities; identify an EDA operation to be performed for the EDA application; select a compute unit among the pool of heterogeneous compute units to execute the EDA operation based on a determined computing capability specific to the selected compute unit; and assign execution of the EDA operation to the selected compute unit.

BRIEF DESCRIPTION OF THE DRAWINGS

Certain examples are described in the following detailed description and in reference to the drawings.

DETAILED DESCRIPTION

The following disclosure relates to EDA applications and CAD systems which may be used to facilitate the design and manufacture of circuits. As technology improves, modern circuit designs may include billions of components and more. To support increasing degrees of circuit design complexity, EDA applications may include various features such as high-level synthesis, schematic capture, transistor or logic simulation, field solvers, functional and physical verifications, geometry processing, equivalence checking, design rule checks, mask data preparation, and more. These various EDA processes may be performed through execution of a series of EDA operations that implement each respective EDA process.

Computing environments configured to execute EDA applications and EDA processes may vary in computational capacities and resource configurations. Computing systems configured to execute EDA applications may include distributed systems ranging from 16 CPUs, to 10,000 of CPUs, many times more. Often times, the computing resources accessible in such computing systems are heterogeneous, with different hardware configurations, processing speeds, network bandwidth or latencies, number of CPUs, available memory systems, physical or virtual resources, and other differing computing capabilities. Increasing the resource utilization in a computing environment with heterogeneous computing resources may improve execution latencies and computing performance of EDA computing systems.

The features described herein may support resource utilization of heterogeneous compute units in execution of EDA operations. In particular, the EDA-based resource utilization features described herein may provide EDA-specific criteria for distribution of EDA operations for execution in a pool of heterogeneous compute units. Such EDA-specific resource utilization criteria may be based on particular resource (e.g., hardware) configurations of available compute resources or be configuration-agnostic (e.g., without direct comparison of hardware or resource configurations between different compute resources).

Configuration-specific EDA resource utilization may include identifying specific computing capabilities relevant to execution of various EDA operations and assigning execution of such EDA operations to compute resources with increased suitability for executing the EDA operations, e.g., units with a threshold CPU speed, network bandwidth, or memory capacity suited for execution of a particular EDA operation or process. Configuration-agnostic EDA resource utilization include benchmarking performance of heterogeneous compute units with regards to different EDA operations and selecting particular computing resources that exhibit a threshold performance characteristics (e.g., lowest execution latency) for execution of EDA operations.

These and other EDA-based resource utilization features are described in greater detail herein.

Figure 1:
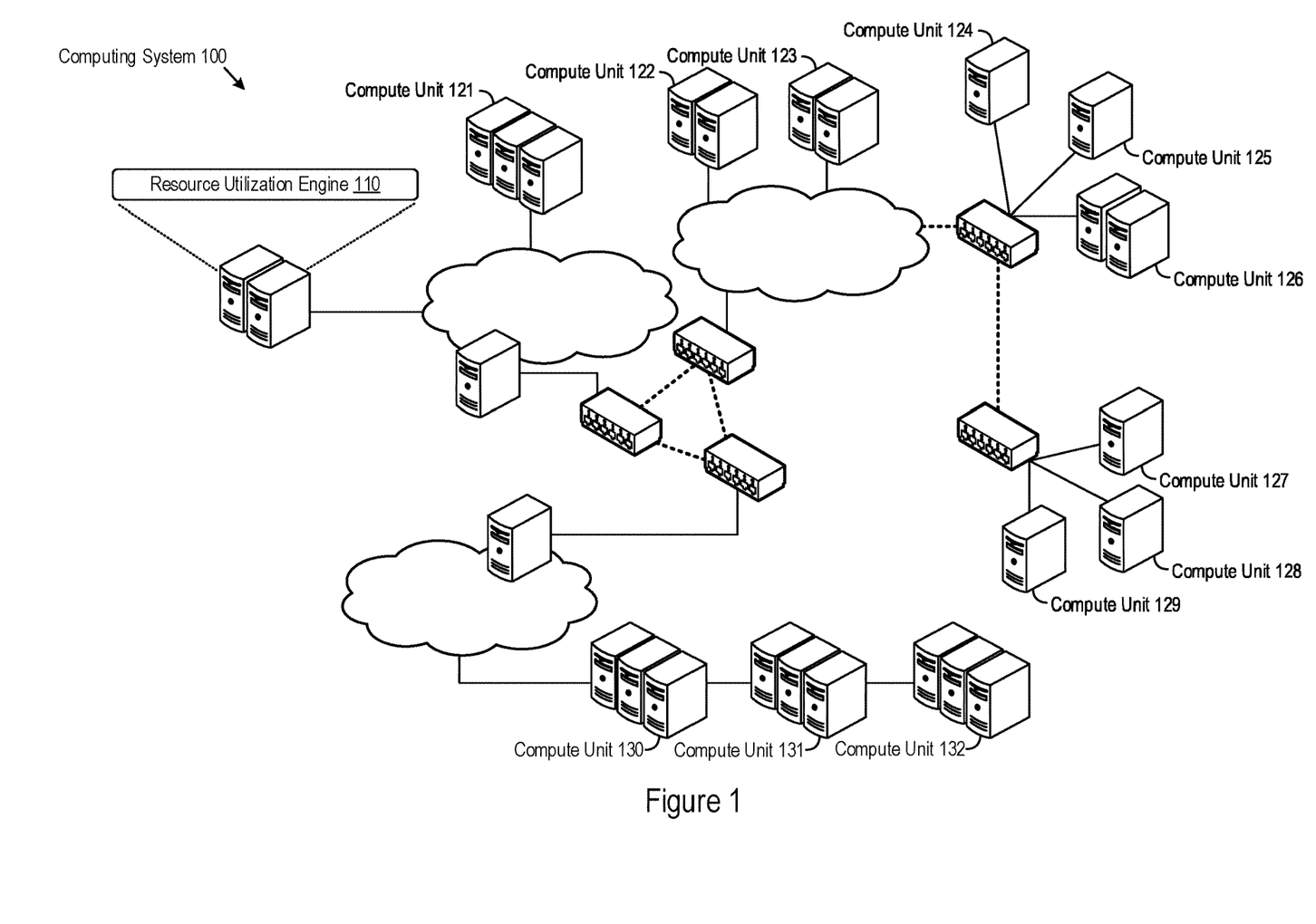
FIG. 1 shows an example of a computing system that supports resource utilization of heterogeneous compute units in execution of EDA operations.

FIG. 1 shows an example of a computing system 100 that supports resource utilization of heterogeneous compute units in execution of EDA operations. The computing system 100 may include a single or multiple computing devices such as application servers, compute nodes, data servers, desktop or laptop computers, smart phones or other mobile devices, tablet devices, embedded controllers, and more. The computing system 100 may include capabilities to assign execution of EDA operations using EDA-specific resource utilization criteria. In that regard, the computing system 100 may account for a particular EDA operation to be executed when selecting computing resources to execute the particular EDA operation.

In connection with the various EDA-based resource utilization features described herein, the computing system 100 may implement, utilize, or otherwise support dynamic resource allocation as described in U.S. patent application Ser. No. 15/873,827 filed on Jan. 17, 2018 and titled "DYNAMIC DISTRIBUTED RESOURCE MANAGEMENT" (the '827 application), which is incorporated herein by reference in its entirety. Computing units used and allocated by the computing system 100 may be maintained and allocated according to the various dynamic allocation mechanisms as described in the '827 application and in accordance with the various EDA-based resource utilization features described herein.

The computing system 100 may include multiple compute units to execute EDA processes and operations. As used herein, a compute unit may refer to any physical, logical, or virtual computing resource used to execute an EDA application. Compute units may be implemented as part of a distributed computing system and take the form of, for example, compute nodes, server blades, server racks, computing clusters, or other various computing resources. As an example implementation, the computing system 100 shown in FIG. 1 includes the compute units 121-132 as part of a distributed computing system. The compute units 121-132 may be interlinked through a communication network with any number of intermediate routing devices. The compute units 121-132 may serve as separate entities (whether physically or logically) capable of performing EDA computations for an EDA process (e.g., design-rule-check processes, optical proximity correction processes, and the like).

A compute unit may be implemented as a combination of hardware and software, and may thus include physical computing resources (e.g., CPUs, memory, network resources, etc.) and processor-executable instructions (e.g., workflow processes, instruction scheduling logic, resource acquisition or thread activation instructions, etc.) to support EDA computations. In operation, the compute units 121-132 may operate in parallel, for example each serving as execution entities that perform EDA operations, whether on specific portions of an IC design or through execution of specific EDA operation sets.

Compute units may be heterogeneous. Two compute units may be referred to as heterogeneous when the compute units differ in at least one computing capability. For instance, the compute units 121-132 may form a pool of heterogeneous compute units in that at least two computing units among the compute units 121-132 differ in a number of CPUs, CPU speeds, memory capacity, network bandwidth, or any other computing capability.

EDA applications may be executed in various types of computing environments, including in whole or in part via cloud computing. As such, the computing system 100 (including the compute units 121-132) may be implemented in part via a public cloud, private cloud, or hybrid cloud. Additionally or alternatively, EDA applications may be executed via a software-as-a-service ("SaaS") distribution model (whether in whole or in part), and the computing resources that comprise the computing system 100 may be off-premise (e.g., with regards to EDA application users), on-premise, or a combination of both. The various EDA features described herein may be implemented as part of a SaaS distribution model or via cloud computing implementations.

As described in greater detail herein, the computing system 100 may control resource utilization among the heterogeneous compute units based on EDA-specific resource utilization criteria. In the context of FIG. 1, the computing system 100 may control which computing resources are utilized amongst the compute units 121-131 by assigning execution of specific EDA operations to selected compute units. In providing EDA-based resource utilization, the computing system 100 may select compute units for EDA operation execution based on specific capabilities of the selected compute units determined as relevant for execution of specific EDA operations. Put another way, the EDA-based resource utilization features described herein may include selection of specific compute units with computing capabilities particularly suited for execution of specific EDA operations. Such EDA-based resource utilization may be performed by a resource utilization engine 110, as shown in FIG. 1.

The computing system 100 may implement the resource utilization engine 110 (and components thereof) in various ways, for example as hardware and programming. The programming for the resource utilization engine 110 may take the form of processor-executable instructions stored on a non-transitory machine-readable storage medium and the hardware for the resource utilization engine 110 may include a processor to execute those instructions. A processor may take the form of single processor or multi-processor systems, and in some examples, the computing system 100 implements multiple engine components or system elements using the same computing system features or hardware components (e.g., a common processor or common storage medium for the resource utilization engine 110 and compute engines 101, 102, and 103).

In operation, the resource utilization engine 110 may identify a pool of heterogeneous compute units configured to execute an EDA application, such as the compute units 121-132 that may include a plurality of compute units with differing computing capabilities. The resource utilization engine 110 may also identify an EDA operation to be performed for the EDA application, select a compute unit among the pool of heterogeneous compute units to execute the EDA operation based on a determined computing capability specific to the selected compute unit, and assign execution of the EDA operation to the selected compute unit.

These and other EDA-based resource utilization features are described in greater detail next, including configuration-specific EDA resource utilizations and configuration-agnostic EDA resource utilizations.

Figure 2:
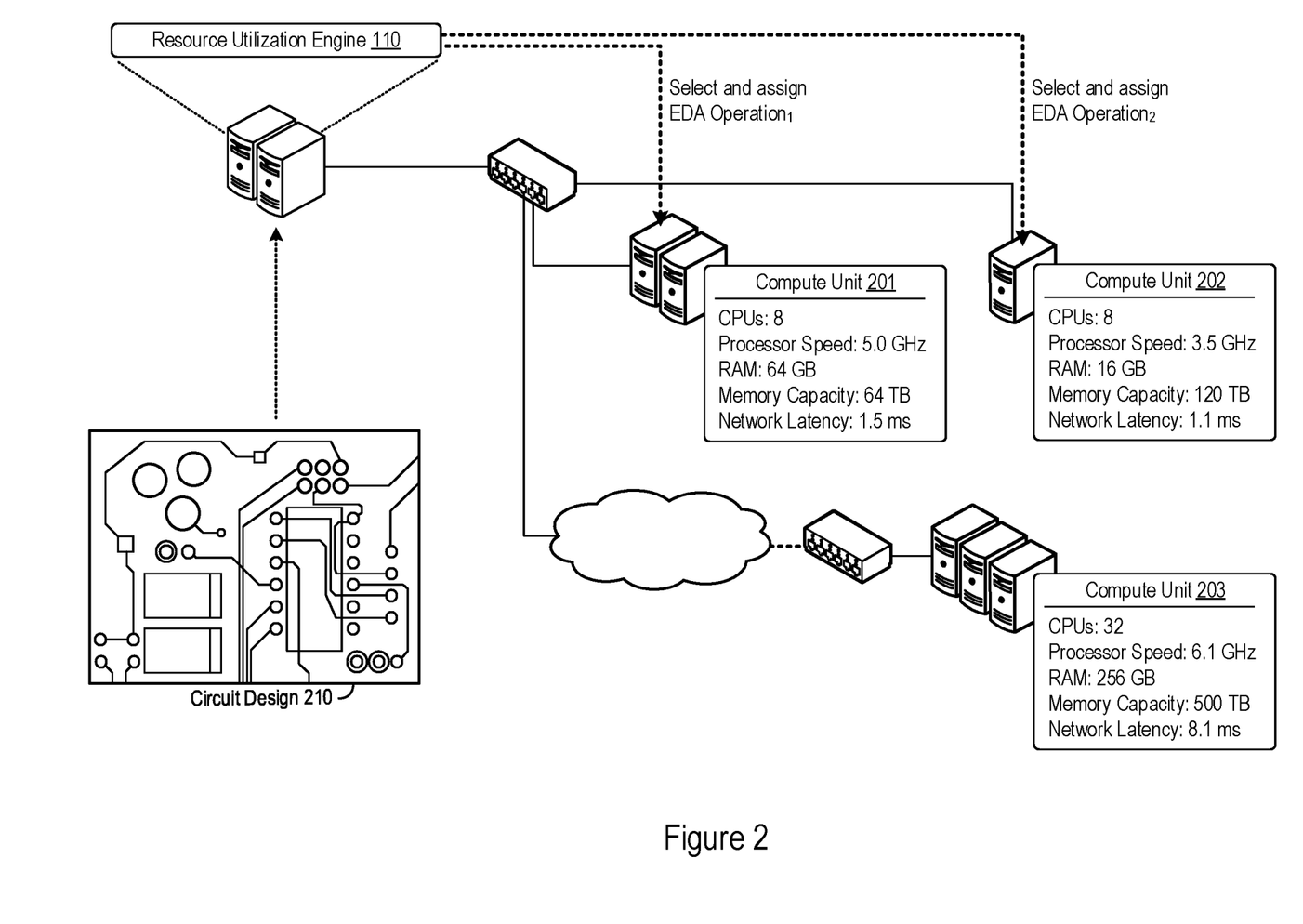
FIG. 2 shows an example of configuration-specific EDA resource utilizations by a resource utilization engine.

FIG. 2 shows an example of configuration-specific EDA resource utilization by the resource utilization engine 110. In the example shown in FIG. 2, the resource utilization engine 110 assigns execution of EDA operations to a distributed computing environment that includes the compute units 201, 202, and 203.

The resource utilization engine 110 may identify the compute units 201, 202, and 203 as a pool of heterogeneous compute units. To do so, the resource utilization engine 110 may determine various computing capabilities of the compute units 201, 202, and 203 respectively. Such a determination may be accomplished via the resource utilization engine 110 polling the compute units 201, 202, and 203 for resource configurations (or other relevant information indicative of computing capabilities). Polling may be regular or irregular, e.g., as part of a resource discovery/identification process during system initiation. Additionally or alternatively, the compute units 201, 202, and 203 themselves may provide any information indicative of respective computing capabilities to the resource utilization engine 110.

In any number of ways, the resource utilization engine 110 may identify that the compute units 201, 202, and 203 are heterogeneous and differ in various computing capabilities including CPUs, processor speeds, available random access memory (RAM), memory capacity, and network latency. Example values for these different computing capabilities are depicted in FIG. 2 for the compute units 201, 202, and 203.

In some implementations, the resource utilization engine 110 determines the overall computing capabilities of the compute units 201, 202, and 203, which may refer to a totality of computing capabilities present in a respective compute unit (e.g., a total of 500 GB of storage, whether such storage capacity is used, reserved, or available). In other examples, the resource utilization engine 110 determines the available computing capabilities of the compute units 201, 202, and 203, which may refer to idle or unused computing capabilities that can be allocated for execution of EDA operations (e.g., 200 GB of available storage for a compute unit with 500 GB of total storage capacity). EDA-based resource utilization features based on overall computing capability, available computing capability, or both, are contemplated herein. Accordingly, any reference to computing capability as used herein may refer to total computing capability or available computing capability, and the resource utilization engine 110 may support EDA-based resource utilizations using either form of computing capability ((or a combination of both).

In operation, the resource utilization engine 110 may account for the differences in computing capabilities for a pool of heterogeneous compute units in scheduling, assigning, or otherwise controlling of computing resources utilized in execution of EDA operations and processes. In the example shown in FIG. 2, the resource utilization engine 110 may assign computing resources in the execution of EDA processes for the design or verification of the circuit design 210. Although the circuit design 210 in FIG. 2 is illustrated as a circuit layout, any circuit format is contemplated, including hierarchical datasets, circuit schematics, RTL or VHDL designs, etc. As such, the resource utilization engine 110 may support the execution of various EDA operations on the circuit design 210.

Some computing capabilities may have a greater impact on the efficiency and execution latency of particular EDA operations than other computing capabilities. For instance, EDA operations that involve Boolean operations, integer comparisons, or scan line processing may be more impacted by processor speed and cache latencies than other computing capabilities. Lithography operations executed for the circuit design 210 may involve fast Fourier transforms, and may benefit from increased memory capacity for efficient executions. In a similar manner, EDA processes that include design rule check (DRC) operations, optical proximity correction (OPC) operations, layout versus schematic (LVS), multi-patterning operations, logic verification operations, synthesis operations, etc., may vary in terms of which particular computing capability (or set of computing capabilities) most impact execution latency.

For a given EDA operation, the resource utilization engine 110 may select a compute unit to assign for execution of the EDA operation based on EDA-specific resource utilization criteria. The EDA-specific resource utilization criteria may correlate EDA operations (or operation types) with specific computing capabilities relevant to the execution of the EDA operations. Such correlations may be preconfigured or user-specified, and the EDA-specific resource utilization criteria may control selection of compute units with specific computing capabilities for execution of particular EDA operations.

To provide a particular illustration, the EDA-specific resource utilization criteria may correlate DRC operations to the specific computing capabilities of processor speed and cache memory speed. In this illustration, the resource utilization engine 110 may select a particular compute unit with a threshold processor speed (e.g., >3.0 GHz) or threshold cache memory speed (e.g., <3.5 clock cycle access) to execute a DRC operation. As another example, the resource utilization engine 110 may select a compute unit from a pool of heterogeneous compute units to perform the DRC operation with a highest processor speed, a highest cache memory speed, or a combination of both.

By way of illustration, the EDA-specific utilization criteria may correlate lithography operations to the specific computing capability of main memory speed, where main memory may refer to physical memory internal to the compute unit (e.g., RAM) as opposed to external storage devices (e.g., hard drives). This may be the case as lithography EDA operations may not cache effectively, and thus benefit from increased memory bandwidth to other system memory resources (e.g., RAM, etc.). In this illustration, the resource utilization engine 110 may select a particular compute unit with a threshold RAM speed (e.g., >900 MHz) to execute the lithography operation. As another example, the resource utilization engine 110 may select a compute unit from a pool of heterogeneous compute units to perform the DRC operation with a highest main memory (e.g., RAM) speed. As yet another illustration, the EDA-specific utilization criteria may correlate multi-patterning EDA operations to specific computing capabilities related to processor speed or cache memory speeds, e.g., depending on implementation (processor speed for integer-based multi-patterning operations or cache size/speed for graph-based multi-patterning operations).

In such a manner, the resource utilization engine 110 may select a compute unit among the pool of heterogeneous compute units 201, 202, and 203 to execute EDA operations based on determined computing capabilities specific to selected compute units. As an illustrative example shown in FIG. 2, the resource utilization engine 110 selects and assigns execution of EDA operation$_1$ to compute unit 201. Execution assignments may be performed by the resource utilization engine 110 through issuing execution instructions, by initializing execution threads for the EDA operation$_1$ on compute unit 201, or by scheduling computing resources on compute unit 201 for the execution of EDA operation$_1$. As also illustrated in FIG. 2, the resource utilization engine 110 selects and assigns execution of EDA operation$_2$ to compute unit 202.

Thus, the resource utilization engine 110 may select compute units with specific configuration-based computing capabilities for execution of EDA operations. By correlating specific EDA operations to relevant computing capabilities, the resource utilization engine 110 may select and assign EDA operation executions to compute units better-suited to execute such EDA operations. That is, the EDA-based resource utilization features described herein may provide a specific EDA-based technical solution to improving application execution latencies in circuit design. In that regard, the resource utilization engine 110 may improve the efficiency of computing systems executing EDA applications and EDA application execution times may be reduced through such EDA-based resource utilization features.

Configuration-specific EDA resource utilization (e.g., as described above) may be based on specific physical or logical computing characteristics of various compute units, such as CPUs, processor speeds, RAM, memory capacity, network latency, etc. On the other hand, configuration-agnostic EDA resource utilizations may be performed by the resource utilization engine 110 without determination of the specific resource configurations of heterogeneous compute units. Example configuration-agnostic EDA resource features are described next in FIGS. 3 and 4.

Figure 3:
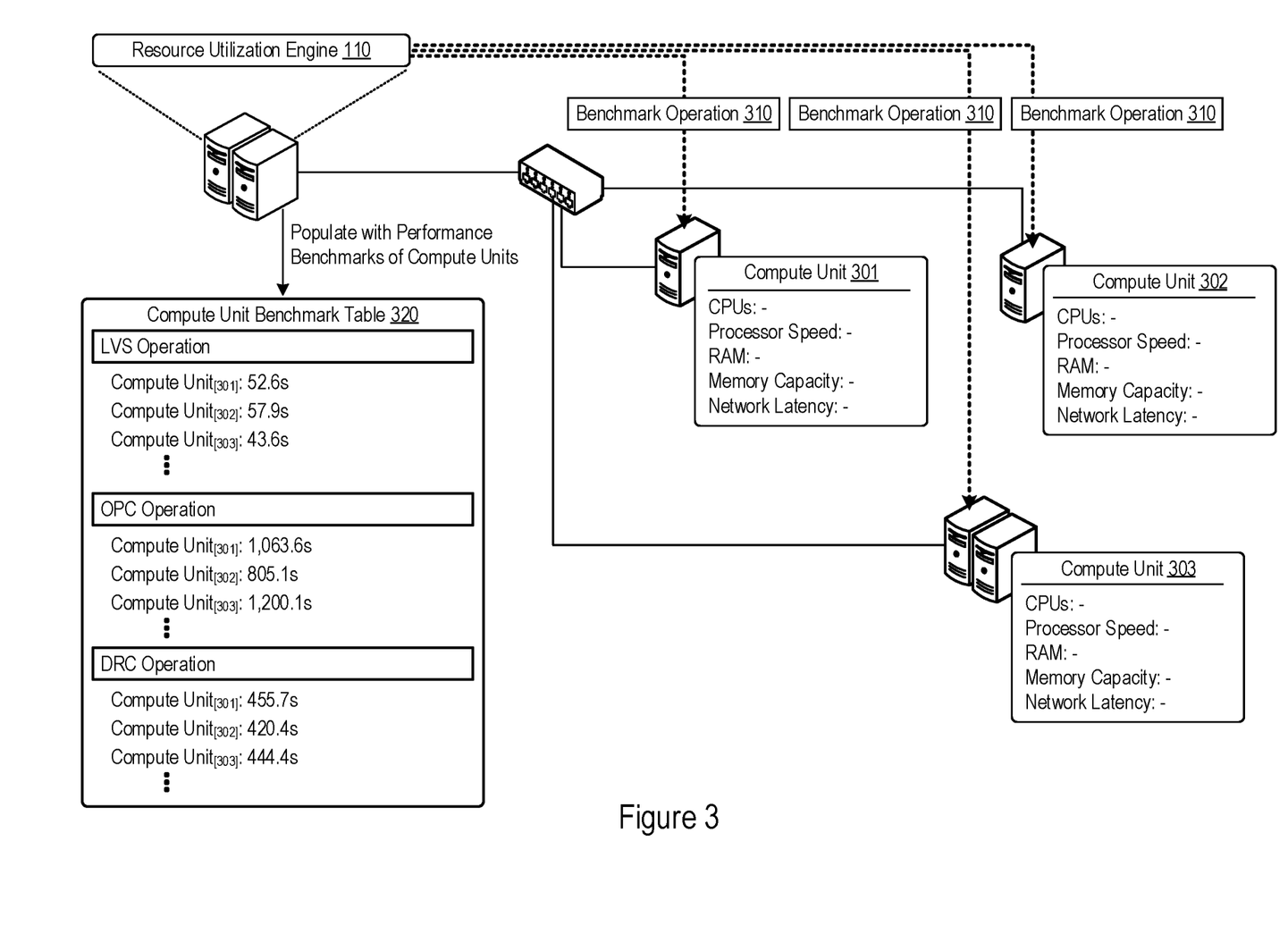
FIG. 3 shows an example of performance benchmarking of EDA operations by the resource utilization engine.

FIG. 3 shows an example of performance benchmarking of EDA operations by the resource utilization engine 110. Through performance benchmarking, the resource utilization engine 110 may characterize heterogeneous compute units without determination of the actual resource configurations of the compute units. That is, the resource utilization engine 110 need not determine the specific number of CPUs, RAM availability, network latency, or other specific computing capabilities of various compute units. Instead, a performance benchmark may serve as the computing capability by which the resource utilization engine 110 selects and assigns execution of different EDA operations. Put another way, a performance benchmark may encapsulate the multiple resource computing capabilities (CPU speed, memory speed, network latency, etc.) into a singular point of reference by which the resource utilization engine 110 can compare and assess various compute units for execution of EDA operations.

In the example shown in FIG. 3, the resource utilization engine 110 identifies the compute units 301, 302, and 303 as computing resources available for execution of an EDA application. Note that in FIG. 3 (and in contrast to FIG. 2), the specific resource configurations of the compute units 301, 302, and 303 (e.g., CPUs, processor speed, RAM, memory capacity, and network latency) are not shown, as the resource utilization engine 110 need not determine these specific resource configurations of the compute units 301, 302, and 303 for selection and EDA operation assignment. Instead, the resource utilization engine 110 may characterize the various compute units 301, 302, and 303 through performance benchmarks. As seen in FIG. 3, the resource utilization engine 110 may send a benchmark operation 310 to each of the compute units 301, 302, and 303 and track execution performance of the compute units 301, 302, and 303.

Benchmark operations issued by the resource utilization engine 110 may be specific to a particular EDA operation. For instance, the benchmark operation 310 issued to compute units 301, 302, and 303 may be a DRC operation or LVS operation, by which the resource utilization engine 110 may characterize the computing capability of the compute units 301, 302, and 303 for DRC or LVS EDA processes. The resource utilization engine 110 may benchmark performance of the compute units 301, 302, and 303 for multiple, different EDA operations. In doing so, the resource utilization engine 110 may correlate a particular computing capability (EDA operation-specific performance benchmark) to each different EDA operation.

Performance benchmarks may take the form of execution latencies for a particular EDA process or EDA operation. In the example shown in FIG. 3, the resource utilization engine 110 maintains a compute unit benchmark table 320. The compute unit benchmark table 320 includes example execution latencies tracked for the compute units 301, 302, and 303 with regards to different EDA operations, including LVS operations, OPC operations, and DRC operations. The compute unit benchmark table 320 may take the form of any data structure(s) used to store performance benchmarks of various compute units.

The tracked execution latencies stored in the compute unit benchmark table 320 may be specific to various EDA operations, allowing the resource utilization engine 110 to assess the compute units 301, 302, and 303 specifically for different EDA operations. Note that the resource utilization engine 110 may identify or confirm the compute units 301, 302, and 303 as a pool of heterogeneous compute units, since the compute units 301, 302, and 303 differ in execution latencies for each of the tracked EDA operations.

In some implementations, the resource utilization engine 110 obtains multiple, different performance benchmarks for a specific EDA operation. The different performance benchmarks may be obtained by the resource utilization engine 110 varying for input circuit design sizes or complexity, the type of circuit being analyzed, or any other configurable parameter by which the resource utilization engine 110 may differentiate parameters for execution of specific EDA operations. To do so, the resource utilization engine 110 may issue multiple, different benchmark operations (or operation sets) for a single EDA operation. The different benchmark operations may be configured by the resource utilization engine 110 to, for example, operate on different input datasets or different representative circuits for the EDA operations being benchmarked.

As described above, the resource utilization may obtain, for different EDA operations, performance benchmarks for compute units among a pool of heterogeneous compute units 301, 302, and 303. The resource utilization engine 110 may use the obtained performance benchmarks to select compute units to execute specific EDA operations. As the performance benchmarks can be determined without any explicit identification or determination of the resource configuration for the compute units 301, 302, and 303, the resource utilization engine 110 may support configuration-agnostic EDA resource utilization, for example as described next in FIG. 4.

Figure 4:
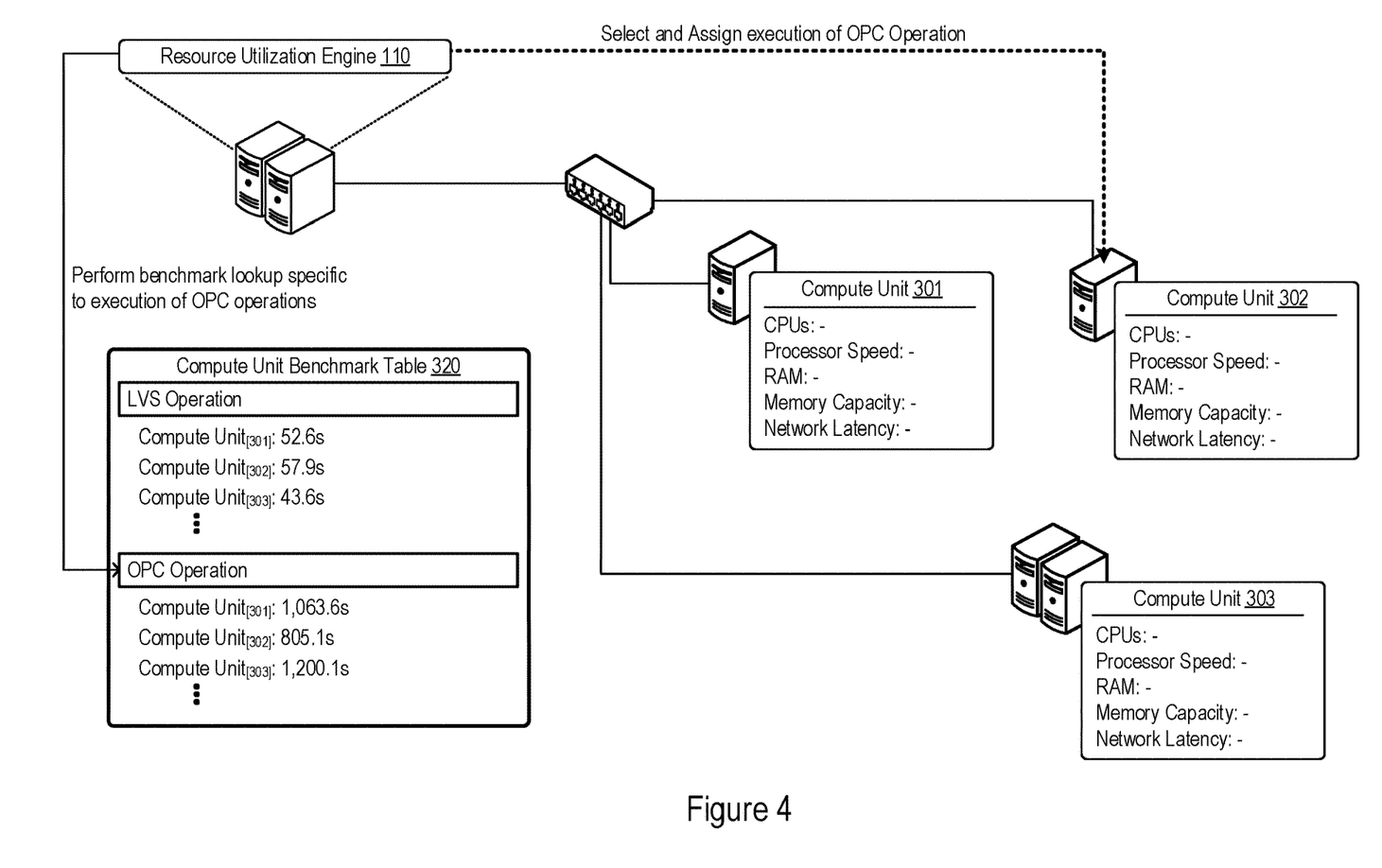
FIG. 4 shows an example of configuration-agnostic EDA resource utilization by the resource utilization engine.

FIG. 4 shows an example of configuration-agnostic EDA resource utilization by the resource utilization engine 110. In particular, FIG. 4 provides an illustrative example of the resource utilization engine 110 selecting a compute unit to perform an OPC operation using determined performance benchmarks.

In particular, the resource utilization engine 110 selects among the compute units 301, 302, and 303 to execute an OPC operation for a circuit design. In making such a selection, the resource utilization engine 110 may perform a benchmark lookup into the compute unit benchmark table 320 to access performance benchmarks for the compute units 301, 302, and 303. Such performance benchmarks may be computing capabilities specific to the compute units 301, 302, and 303 respectively, and the resource utilization engine 110 may determine such computing capabilities without needing to determine or identify any particular resource (hardware or virtual) configuration of the compute units 301, 302, and 303.

As noted herein, obtained performance benchmarks may be EDA operation specific. That is, the resource utilization engine 110 may determine computing capabilities (e.g., performance benchmarks) for the compute units 301, 302, and 303 specific to the OPC operation to be assigned. In FIG. 3, the resource utilization engine 110 performs a performance benchmark lookup into the compute unit benchmark table 320 specific to execution of OPC operations. Returned computing capabilities may include performance benchmarks in the form of execution latencies: 1,063.6 s for compute unit 301, 805.1 s for compute unit 302, and 1,200.1 s for compute unit 303. In this example, the resource utilization engine 110 selects the compute unit with the lowest execution latency (or put another way, best performance benchmark) for OPC operation. Accordingly, the resource utilization engine 110 may select and assign execution of the OPC operation to the compute unit 302 (with the lowest execution latency for OPC operations).

In some implementations, the compute unit benchmark table 320 may store multiple performance benchmarks specific to OPC operations (e.g., when OPC benchmarks are obtained for multiple representative input circuit designs). The resource utilization engine 110 may select a particular performance benchmark that correlates to the circuit design the OPC operation will be executed for (e.g., circuit design 210). For example, the resource utilization engine 110 may select a performance benchmark most closely correlated in circuit size, layout, design, or circuit type among the multiple OPC operation benchmarks. Compute unit selection may be based on the selected performance benchmark (e.g., how the individual compute units compare for the selected performance benchmark).

In other examples, the resource utilization engine 110 may combine multiple performance benchmarks for compute unit selection. For instance, the resource utilization engine 110 may average multiple execution latencies tracked for different OPC benchmark operations, and select the compute units with the lowest average execution latency for OPC operations. Weighted averages may be supported by the resource utilization engine 110, for example according to customizable weights (e.g., user specified).

In any of the ways described above, the resource utilization engine 110 may support configuration-agnostic EDA resource utilization. Such features may be tailored specific to compute unit performance of EDA operations, and done without having to identify or compare between specific resource configurations of compute units. Instead, the resource utilization engine 110 may weight (e.g., solely) performance of the compute units for specific EDA operations, allowing the resource utilization engine 110 to make a comprehensive assessment of performance capabilities of heterogeneous compute units and optimize resource utilizations. As such, configuration-agnostic EDA resource utilization may improve EDA computing systems by decreasing execution latencies and improving computation efficiency.

As described herein, the resource utilization engine 110 may support EDA-based resource utilizations in various ways. In implementing any of the EDA-based resource utilization features described herein, the resource utilization engine 110 may support static and dynamic resource prioritizations. In static resource prioritizations, the resource utilization engine 110 may access a static resource list, by which a user may manually correlate specific compute units to specific EDA operations or processes. In that way, the resource utilization engine 110 may support customizable resource assignments by which users or system administrators may manually control resource assignments for execution of EDA applications, doing so on a per-EDA operation basis.

In some implementations, the resource utilization engine 110 may support dynamic resource prioritizations, which may include any dynamic reassessment of compute units or other computing resources during EDA application execution. For instance, during execution, the resource utilization engine 110 may collect performance or other computing statistics specific to compute units, include as examples EDA execution times, actual processor speeds, average available memory or RAM capacities, maximum idle times, etc. These dynamically collected performance statistics may serve as updated computing capabilities by which the resource utilization engine 110 assesses available computing resources, and the resource utilization engine 110 may dynamically adjust resource selections for execution of subsequent EDA operations based on the updated compute capabilities. For example, the actual run-time execution times may serve as updated performance benchmarks, and the resource utilization engine 110 may select compute units for execution of subsequent EDA operations based on the updated performance benchmarks. Any other consistent dynamic/run-time adjustments are also contemplated herein.

Figure 5:
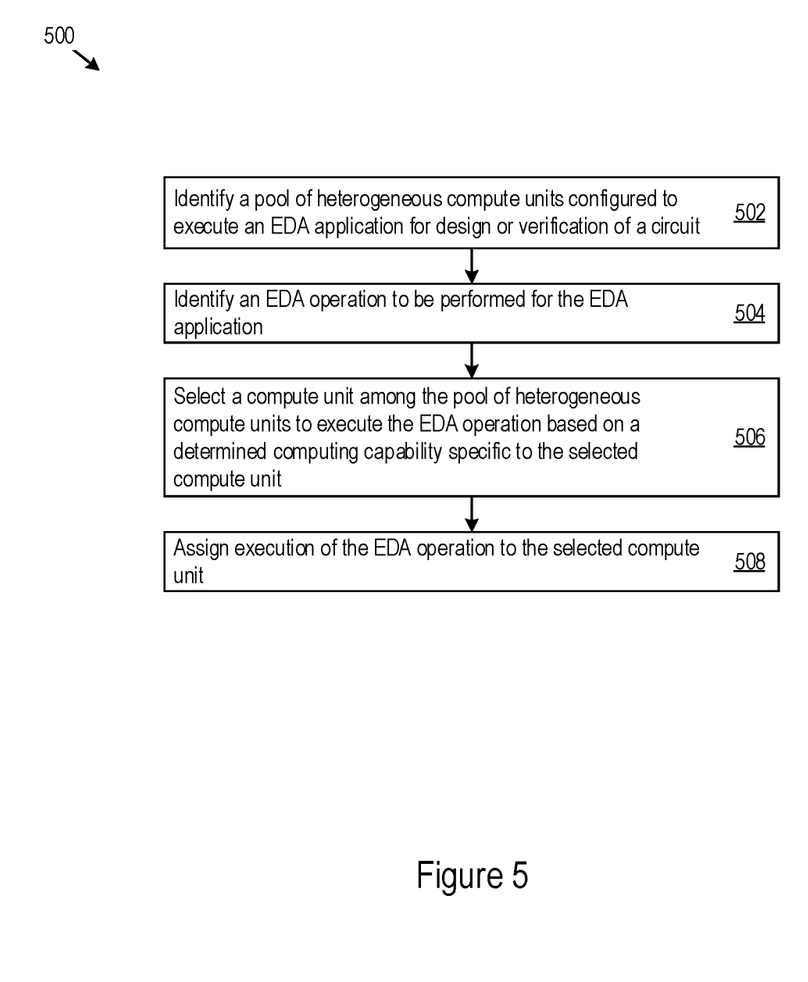
FIG. 5 shows an example of logic that a system may implement to support resource utilization of heterogeneous compute units in execution of EDA operations.

FIG. 5 shows an example of logic 500 that a system may implement to support resource utilization of heterogeneous compute units in execution of EDA operations. In some examples, the computing system 100 may implement the logic 500 as hardware, executable instructions stored on a machine-readable medium, or as a combination of both. The computing system 100 may implement the logic 500 via the resource utilization engine 110, for example, through which the computing system 100 may perform or execute the logic 500 as a method to support resource utilization of heterogeneous compute units in execution of EDA operations. The following description of the logic 500 is provided using the resource utilization engine 110 as an implementation example. However, various other implementation options by a system are possible.

In implementing the logic 500, the resource utilization engine 110 may identify a pool of heterogeneous compute units configured to execute an EDA application for design or verification of a circuit (502). The pool of heterogeneous compute units may include a plurality of compute units with differing computing capabilities, and the resource utilization engine 110 may identify the compute units during system initialization or via resource discovery. Additionally or alternatively, the resource utilization engine 110 may listen on selected network ports as compute units communicate status and resource configuration data to the resource utilization engine 110.

The resource utilization engine 110 may identify an EDA operation to be performed for the EDA application (504). For example, the resource utilization engine 110 may control resource scheduling and EDA operation execution for the EDA application. In some implementations, the resource utilization engine 110 may implement an EDA operation queue to schedule and assign EDA operations for execution by computing resources (e.g., compute units) in an EDA computing environment.

The resource utilization engine 110 may select a compute unit among the pool of heterogeneous compute units to execute the EDA operation based on a determined computing capability specific to the selected compute unit (506). As described herein, the computing capability may be a specific resource configuration, such as a number of CPUs, RAM speed, network latency, instruction set architecture, etc. In other examples, the computing capability may be configuration agnostic, such as an execution latency or other performance benchmark for the compute unit. Compute unit selection may be based on EDA-specific resource utilization criteria, for example any compute unit with a threshold level of a particular computing capability specific to the EDA operation or the compute unit with the highest (e.g., best) level of the particular computing capability (e.g., highest number of CPUs, lowest network latency, fastest memory speed, etc.). Then, the resource utilization engine 110 may assign execution of the EDA operation to the selected compute unit (508).

While an example implementation of EDA-based resource utilization features is shown and described through FIG. 5, the logic 500 may include any number of additional or alternative steps as well. The logic 500 may additionally or alternatively implement any other EDA-based resource utilization features described herein, for example any with respect to the resource utilization engine 110.

Figure 6:
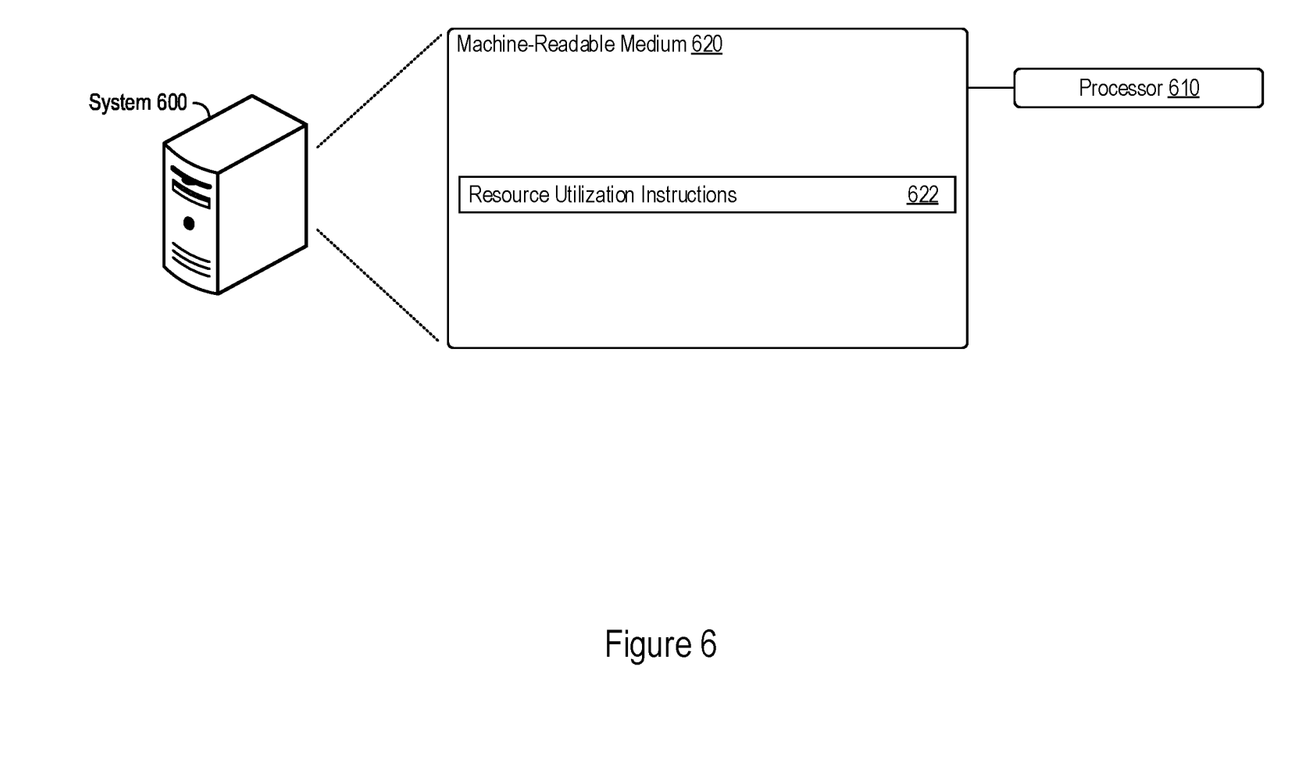
FIG. 6 shows an example of a system that supports resource utilization of heterogeneous compute units in execution of EDA operations.

FIG. 6 shows an example of a system 600 that supports resource utilization of heterogeneous compute units in execution of EDA operations. The system 600 may include a processor 610, which may take the form of a single or multiple processors. The processor(s) 610 may include a central processing unit (CPU), microprocessor, or any hardware device suitable for executing instructions stored on a machine-readable medium. The system 600 may include a machine-readable medium 620. The machine-readable medium 620 may take the form of any non-transitory electronic, magnetic, optical, or other physical storage device that stores executable instructions, such as the resource utilization instructions 622 shown in FIG. 6. As such, the machine-readable medium 620 may be, for example, random access memory (RAM) such as a dynamic RAM (DRAM), flash memory, spin-transfer torque memory, an electrically-erasable programmable read-only memory (EEPROM), a storage drive, an optical disk, and the like.

The system 600 may execute instructions stored on the machine-readable medium 620 through the processor 610. Executing the instructions may cause the system 600 to perform any of the EDA-based resource utilization features described herein, including according to any of the features of the resource utilization engine 110.

For example, execution of the resource utilization instructions 622 by the processor 610 may cause the system 600 to identify a pool of heterogeneous compute units configured to execute an EDA application for design or verification of a circuit, wherein the pool of heterogeneous compute units includes a plurality of compute units with differing computing capabilities; identify an EDA operation to be performed for the EDA application; select a compute unit among the pool of heterogeneous compute units to execute the EDA operation based on a determined computing capability specific to the selected compute unit; and assign execution of the EDA operation to the selected compute unit.

The systems, methods, devices, and logic described above, including the compute engines 101, 102, and 103 as well as the resource utilization engine 110, may be implemented in many different ways in many different combinations of hardware, logic, circuitry, and executable instructions stored on a machine-readable medium. For example, the compute engines 101, 102, and 103, the resource utilization engine 110, or combinations thereof, may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. A product, such as a computer program product, may include a storage medium and machine readable instructions stored on the medium, which when executed in an endpoint, computer system, or other device, cause the device to perform operations according to any of the description above, including according to any features of the compute engines 101, 102, and 103, the resource utilization engine 110, or combinations of both.

The processing capability of the systems, devices, and engines described herein, including the compute engines 101, 102, and 103 as well as the resource utilization engine 110, may be distributed among multiple system components, such as among multiple processors and memories, optionally including multiple distributed processing systems or cloud/network elements. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library (e.g., a shared library).

While various examples have been described above, many more implementations are possible.

The invention claimed is:

1. A method performed by a computing system, the method comprising:
    identifying a pool of heterogeneous compute units configured to execute an electronic design automation (EDA) application for design or verification of a circuit, wherein the pool of heterogeneous compute units includes a plurality of compute units with differing computing capabilities;
    identifying an EDA operation to be performed for the EDA application;
    selecting a compute unit among the pool of heterogeneous compute units to execute the EDA operation based on a determined computing capability specific to the selected compute unit; and
    assigning an execution of the EDA operation to the selected compute unit,
    wherein the determined computing capability comprises a performance benchmark for the EDA operation specific to the selected compute unit, and further comprising obtaining, for different EDA operations, performance benchmarks for the plurality of compute units included in the pool of heterogeneous compute units, including by:
        issuing benchmark operations specific to the different EDA operations to each of the plurality of compute units included in the pool of heterogeneous compute units; and
        tracking performance of each of the plurality of compute units in executing the issued benchmark operations.

2. The method of claim 1, wherein the determined computing capability further comprises a threshold number of central processing units (CPUs), a threshold processor speed, a threshold memory speed, or a threshold amount of available memory.

3. The method of claim 1, wherein the selecting comprises:
identifying a particular computing capability relevant to the EDA operation; and
selecting a particular compute unit from among the pool of heterogeneous compute units with a highest measure of the particular computing capability.

4. The method of claim 1, wherein the EDA operation is a design-rule-check (DRC) operation; and
wherein the selecting comprises selecting a particular compute unit among the pool of heterogeneous compute units to perform the DRC operation with a highest processor speed, a highest cache memory speed, or a combination of both.

5. The method of claim 1, wherein the EDA operation is a lithography operation; and
wherein the selecting comprises selecting a particular compute unit among the pool of heterogeneous compute units to perform the lithography operation with a highest main memory speed.

6. The method of claim 1, comprising obtaining the performance benchmarks for the plurality of compute units and selecting the computing unit among the pool of heterogeneous compute units to execute the EDA operation without determining specific resource configurations of the plurality of computing units.

7. A system comprising:
a pool of heterogeneous compute units configured to execute an electronic design automation (EDA) application for design or verification of a circuit, wherein the pool of heterogeneous compute units includes a plurality of compute units with differing computing capabilities; and
a resource utilization engine configured to:
identify an EDA operation to be performed for the EDA application;
select a compute unit among the pool of heterogeneous compute units to execute the EDA operation based on a determined computing capability specific to the selected compute unit; and
assign an execution of the EDA operation to the selected compute unit,
wherein the determined computing capability comprises a performance benchmark for the EDA operation specific to the selected compute unit, and
wherein the resource utilization engine is further configured to obtain, for different EDA operations, performance benchmarks for the plurality of compute units included in the pool of heterogeneous compute units, including by:
issuing benchmark operations specific to the different EDA operations to each of the plurality of compute units included in the pool of heterogeneous compute units; and
tracking performance of each of the plurality of compute units in executing the issued benchmark operations.

8. The system of claim 7, wherein the determined computing capability further comprises a threshold number of central processing units (CPUs), a threshold processor speed, a threshold memory speed, or a threshold amount of available memory.

9. The system of claim 7, wherein the resource utilization engine is configured to select the compute unit by:
identifying a particular computing capability relevant to the EDA operation; and
selecting a particular compute unit from among the pool of heterogeneous compute units with a highest measure of the particular computing capability.

10. The system of claim 7, wherein:
the EDA operation is a design-rule-check (DRC) operation; and
the resource utilization engine is configured to select a particular compute unit among the pool of heterogeneous compute units to perform the DRC operation with a highest processor speed, a highest cache memory speed, or a combination of both.

11. The system of claim 7, wherein:
the EDA operation is a lithography operation; and
the resource utilization engine is configured to select a particular compute unit among the pool of heterogeneous compute units to perform the lithography operation with a highest main memory speed.

12. The system of claim 7, wherein the resource utilization engine is configured to obtain the performance benchmarks for the plurality of compute units and select the computing unit among the pool of heterogeneous compute units to execute the EDA operation without determining specific resource configurations of the plurality of computing units.

13. The system of claim 7, wherein the performance benchmarks comprise execution latencies for executions of the EDA operation by the plurality of computing units.

14. A non-transitory machine-readable medium comprising instructions that, when executed by a processor, cause a system to:
identify a pool of heterogeneous compute units configured to execute an electronic design automation (EDA) application for design or verification of a circuit, wherein the pool of heterogeneous compute units includes a plurality of compute units with differing computing capabilities;
identify an EDA operation to be performed for the EDA application;
select a compute unit among the pool of heterogeneous compute units to execute the EDA operation based on a determined computing capability specific to the selected compute unit; and
assign an execution of the EDA operation to the selected compute unit,
wherein the determined computing capability comprises a performance benchmark for the EDA operation specific to the selected compute unit, and wherein the instructions, when executed by the processor, further cause the system to obtain, for different EDA operations, performance benchmarks for the plurality of compute units included in the pool of heterogeneous compute units, including by:
issuing benchmark operations specific to the different EDA operations to each of the plurality of compute units included in the pool of heterogeneous compute units; and
tracking performance of each of the plurality of compute units in executing the issued benchmark operations.

15. The non-transitory machine-readable medium of claim 14, wherein the determined computing capability further comprises a threshold number of central processing units (CPUs), a threshold processor speed, a threshold memory speed, or a threshold amount of available memory.

16. The non-transitory machine-readable medium of claim 14, wherein the instructions to select a compute unit among the pool of heterogeneous compute units comprise instructions that, when executed, cause the system to:
- identify a particular computing capability relevant to the EDA operation; and
- select a particular compute unit from among the pool of heterogeneous compute units with a highest measure of the particular computing capability.

17. The non-transitory machine-readable medium of claim 14, wherein:
- the EDA operation is a design-rule-check (DRC) operation; and
- the instructions to select the compute unit comprise instructions that, when executed, cause the system to select a particular compute unit among the pool of heterogeneous compute units to perform the DRC operation with a highest processor speed, a highest cache memory speed, or a combination of both.

18. The non-transitory machine-readable medium of claim 14, wherein:
- the EDA operation is a lithography operation; and
- the instructions to select the compute unit comprise instructions that, when executed, cause the system to select a particular compute unit among the pool of heterogeneous compute units to perform the lithography operation with a highest main memory speed.

19. The non-transitory machine-readable medium of claim 14, wherein the instructions, when executed by the processor, cause the system to obtain the performance benchmarks for the plurality of compute units and select the computing unit among the pool of heterogeneous compute units to execute the EDA operation without determining specific resource configurations of the plurality of computing units.

20. The non-transitory machine-readable medium of claim 14, wherein the performance benchmarks comprise execution latencies for executions of the EDA operation by the plurality of computing units.

* * * * *